2,955,020
METHOD OF PREPARING MONOPERSULFATES

Leonard R. Darbee, Grand Island, and James R. Kolczynski, Williamsville, N.Y., assignors to Food Machinery and Chemical Corporation, New York, N.Y., a corporation of Delaware No Drawing. Filed Oct. 15, 1958, Ser. No. 767,274

14 Claims. (Cl. 23—114)

This invention relates to the monopersulfates, and particularly to an improved method for the preparation of the monopersulfates of ammonium and various metals.

Heretofore the monopersulfates have been produced by neutralization of monopersulfuric acid, otherwise known as Caro's acid, with the corresponding hydroxide or carbonate of the cation desired in the monopersulfate salt. This process of preparing the salts was taught generally by Mellor: A Comprehensive Treatise on Inorganic and Theoretical Chemistry, vol. X, pp. 482–485 (1930), and more recently an improved process for carrying out this conversion was made the subject of U.S. Patent No. 2,802,722, to S. E. Stephanou. The reaction involved in the method is illustrated by the following formula:

$$2H_2SO_5 + M(OH)_2 \rightarrow M(HSO_5)_2 + 2H_2O$$

The neutralization method taught by Mellor and in the above U.S. patent has been useful in preparing monopersulfates, however, it leads to certain inherent difficulties. Caro's acid is prepared commonly by electrolysis of sulfuric acid to dipersulfuric acid, and hydrolysis of the dipersulfuric acid ($H_2S_2O_8$) to produce monopersulfuric acid ($H_2SO_5$). Another useful method of preparing Caro's acid is by the reaction of hydrogen peroxide with sulfuric acid. In either case, a substantial amount of sulfuric acid is present in the Caro's acid produced, and removal of the sulfuric acid impurity is impractical. Accordingly, when the Caro's acid is neutralized with the carbonate of hydroxide of the desired cation, the sulfuric acid is also neutralized. This means that irrespective of the efficiency of the conversion of Caro's acid to monopersulfate, a substantial amount of unwanted by-product is produced from the sulfuric acid which is present with the Caro's acid during neutralization.

It is a feature of the present invention to provide an improved method of preparing monopersulfates, involving reaction of materials which are obtainable substantially free of contaminants which react in competition with the monopersulfate-forming reaction.

It is a further feature of this invention to provide such a method which operates with very little loss of active oxygen from the reaction system, even at temperatures heretofore considered unduly high for monopersulfate production.

In accordance with the present invention, the dipersulfate of ammonium or an alkali metal or alkaline earth metal is reacted, in the presence of a catalytic amount of a strong inorganic acid, with concentrated hydrogen peroxide to provide the corresponding monopersulfate. The hydrogen peroxide is preferably employed in concentrations of at least about 50%, with higher peroxide concentrations favoring higher yields of monopersulfate.

The present reaction is carried out at about 50°–120° C. and preferably at about 80°–100° C. Surprisingly, little or no loss of active oxygen is encountered in this reaction, despite operation at these elevated temperatures which heretofore in other monopersulfate production methods were found highly destructive of active oxygen. Likewise, the dipersulfates and hydrogen peroxide are readily produced in quite pure form, being available free of substantial amounts of ingredients which necessarily react in competition with the monopersulfate-forming reaction under present conditions. Accordingly, high yields of monopersulfate can be produced.

The dipersulfates have the formula $M(S_2O_8)_x$, where $x=\frac{1}{2}$ the valence of the cation M. The cations which are of particular interest are ammonium, the alkali metal cations, and the alkaline earth metal cations. The metal cations are discussed for example in chapters IV and V, Reference Book of Inorganic Chemistry, Latimer and Hildebrand, third edition, Macmillan Co. (1951).

The dipersulfates employed in the present reactions can be produced by electrolysis of the corresponding sulfate, by neutralization of dipersulfuric acid, by reaction of ammonium persulfate with the corresponding carbonate or hydroxide, or by other suitable means. In any case the persulfate can be provided in essentially pure form for use in the present reaction. However, the present process is not restricted to the use of pure dipersulfates. Where dipersulfates contaminated with impurities are available they may be employed as starting materials, it being possible to separate the impurities and any by-products formed, by standard selective dissolution and precipitation, or other techniques.

It is important that the hydrogen peroxide employed in producing monopersulfates by the herein reaction be aqueous hydrogen peroxide having a hydrogen peroxide concentration of at least about 50%. It has been found that use of hydrogen peroxide at substantially lower concentrations causes lower yields of monopersulfate to be produced, and likewise causes undue loss of active oxygen. This may be due to reaction of the water in the dilute hydrogen peroxide with the dipersulfate. Regardless of the reason, however, it has been found important to use hydrogen peroxide of at least the concentration specified above.

The present reaction of hydrogen peroxide with dipersulfate has been found to take place to a practical extent only when it is carried out in the presence of a catalytic amount of certain acids. Suitable acids are various inorganic acids which when used in an amount of about 0.25 to 10 weight percent of reaction mixture provide about 0.05 to 2.2 equivalents of hydrogen ion per kilogram of reaction mixture and which do not have a decomposing effect on active oxygen. Typical useful acids having these properties include the oxygenated inorganic acids such as perchloric acid, sulfuric acid, nitric acid, potassium acid sulfate, phosphoric acid, and the like.

The reaction of the present process should be carried out at about 50°–120° C., and preferably at about 80°–100° C., in about one to five minutes. The reaction can be conducted for longer times if desired. Lower temperatures have been found to result in production of low yields of product, and surprisingly, favor decomposition of active oxygen in the system. Operation at temperatures higher than about 120° C., on the other hand, sometimes results in the formation of detonable vapour mixtures and in decomposition of the active oxygen-containing material in the reaction mixture. The extent of decomposition encountered at about 120° C. or above depends in part on the particular monopersulfate being prepared.

The hydrogen peroxide and dipersulfate react together quantitatively in the preparation of monopersulfate. However, frequently it is desired to conduct the reaction in the presence of an excess of the liquid hydrogen peroxide, for reasons of handling. This is not critical, however, and it is possible to use quantitative amounts of ingredients, to use an excess of dipersulfate, or even to operate with a large excess of hydrogen peroxide. Operation with a large excess of peroxide, for example, is well suited to continuous operation, it being possible to introduce dipersulfate continuously into a reservoir of hydrogen peroxide, and continuously to remove reaction products from the peroxide reservoir.

The reaction can be carried out to provide in one pass a 75% or higher conversion of the dipersulfate to the monopersulfate, with little or no loss of active oxygen. However, it should be noted that for some applications mixtures of the mono- and di- persulfates have desirable properties, as the mono- and di- salts have different oxidation potentials, and their mixtures can be employed in complex systems with each providing its particular advantage. Furthermore, such mixtures have physical and stability properties which suit them for a variety of applications.

Consequently, by reason of a desire to provide a particular mixture of monopersulfate and dipersulfate, or for handling or for other reasons, the reaction may be conducted under conditions which provide less than optimum yields. In such cases, some side products such as the metal sulfate may be produced. The desired monopersulfate or monopersulfate-dipersulfate mixture can be isolated readily from a reaction mixture which contains unreacted peroxide and dipersulfate, or by-products, by cooling and precipitation of the persulfate product, if desired followed by selective dissolution, or by other standard separation techniques.

The following examples are included by way of illustration only, and are not intended to be limitative of reaction conditions, ingredients or results. The products were analyzed for hydrogen peroxide, monopersulfate and dipersulfate contents by the Ceriometric method of Csanyi and Solymosi, Z. Anal. Chem. 142, pp. 423-6 (1954).

EXAMPLE 1

Four hundred and forty grams of ammonium dipersulfate, 70 grams of 90% hydrogen peroxide and 6 grams of concentrated sulfuric acid were stirred together in a beaker. The reaction mixture was heated to 100° C. where it was maintained for five minutes. At the end of this time, the reaction mixture was cooled and analyzed. It contained 312 grams of ammonium monopersulfate, $NH_4HSO_5$, and 37 grams of ammonium dipersulfate $(NH_4)_2S_2O_8$. The product yield was 67% of the ammonium dipersulfate reacted. Of the active oxygen introduced into the reaction mixture, 55 grams were present in the product mixture, indicating an active oxygen retention of 88.6%.

EXAMPLE 2

One thousand grams of potassium dipersulfate was mixed with 142 grams of 90% hydrogen peroxide and 18 grams of concentrated sulfuric acid. The mixture was pumped into a cylindrical reaction chamber and maintained therein at a temperature of 100° C. Flow rates through the reaction cylinder were adjusted so that the mixture was maintained at the 100° C. temperature for about 5 minutes. The product of the reaction contained 870 grams of potassium monopersulfate and 162 grams of potassium dipersulfate, indicating a yield of 93% of the potassium dipersulfate reacted. No loss of active oxygen could be determined.

EXAMPLE 3

One thousand grams of potassium dipersulfate, 142 grams of 90% hydrogen peroxide and 18 grams of concentrated sulfuric acid were stirred together for 5 minutes in a beaker at 100° C. Thereafter the reaction mixture was poured out of the beaker, and allowed to cool and solidify. The product contained 805 grams of potassium monopersulfate and 28 grams of potassium dipersulfate. The yield was 76% of the potassium dipersulfate reacted. Of 119 grams of active oxygen introduced into the reaction mixture 111 were present in the reaction product mixture. The active oxygen retained was therefore 93.5%.

EXAMPLE 4

Three hundred and seventy grams of sodium dipersulfate, 142 grams of 90% hydrogen peroxide and 9 grams of concentrated sulfuric acid were mixed together to form a slurry. This slurry was heated in a 1000 ml. beaker to 122° C., at which temperature it was maintained for 5 minutes. The product mixture was then poured into a crystallizing dish and allowed to cool and solidify. The product mixture contained 86 grams of unreacted hydrogen peroxide, 176 grams of sodium dipersulfate and 204 grams of sodium monopersulfate. The yield of sodium monopersulfate was 92% of the sodium dipersulfate reacted. Active oxygen retention amounted to 89.4% of the active oxygen originally introduced into the reaction mixture.

EXAMPLE 5

Three hundred and fifty grams of magnesium dipersulfate, 71 grams of 90% hydrogen peroxide and 9 grams of concentrated sulfuric acid were heated in a 600 milliliter beaker to 100° C., where they were maintained for 2 minutes, with constant stirring. The reaction mixture then was cooled to room temperature. The product of reaction contained 337 grams of magnesium monopersulfate and 50 grams of magnesium dipersulfate, in addition to the hydrogen peroxide which had been introduced in excess. The yield of magnesium monopersulfate was 83.5% of the reacted magnesium dipersulfate. Active oxygen retention was 93.3%.

EXAMPLE 6

Two hundred and thirty grams of calcium dipersulfate, 36 grams of 90% hydrogen peroxide and 4 grams of concentrated sulfuric acid were heated in a 600 milliliter beaker at 82° C. for about 1 minute with constant stirring. The beaker containing the mixture was then plunged into an ice bath. The reaction product contained 136 grams of calcium monopersulfate and 29 grams of calcium dipersulfate. The yield of calcium monopersulfate was 60% of the calcium dipersulfate reacted. 87.8% of the active oxygen introduced into the reaction mixture was retained.

EXAMPLE 7

This example is presented to illustrate the effect of hydrogen peroxide concentration on monopersulfate yield. In these reactions mixtures of 100 grams of potassium dipersulfate, 2 grams of concentrated sulfuric acid, and amounts of aqueous hydrogen peroxide equivalent to 12.6 grams of 100% hydrogen peroxide were mixed in 400 milliliter beakers and heated to 100° C. for 5 minutes with stirring. The reaction product mixtures were cooled to room temperature and analyzed. Results are expressed in terms of molar conversion of initial potassium dipersulfate to potassium acid monopersulfate. Results of the reactions are indicated in Table I which follows:

*Table I*

|  | Concentration $H_2O_2$ Used in Percent | Conversion in Percent |
|---|---|---|
| (a) | 35 | 10 |
| (b) | 50 | 35 |
| (c) | 70 | 61 |
| (d) | 90 | 68 |
| (e) | 98 | 73 |
| (f) | 99 | 74 |

EXAMPLE 8

The following experiments are included to show the effect of varying the molar ratio of hydrogen peroxide to dipersulfate on the conversion of the latter to monopersulfate. In these examples mixtures of 100 grams of potassium dipersulfate, 2 grams of concentrated sulfuric acid, and amounts of 90% hydrogen peroxide sufficient to achieve the proper molar ratio were mixed in 500 milliliter beakers and heated at 100° C. for 5 minutes. The product mixtures then were cooled and analyzed. Results are expressed in terms of molar conversion to potassium acid persulfate. Results of the experiments are shown in Table II which follows:

*Table II*

| Molar Ratio, $H_2O_2$/dipersulfate | Conversion, Percent |
|---|---|
| 1:1 | 68 |
| 1.5:1 | 78 |
| 2:1 | 83 |
| 5:1 | 85 |

EXAMPLE 9

This example is included to show the effect of amount of acid catalyst on the reaction. In these reactions mixtures of 100 grams of potassium dipersulfate, 14.0 grams of 90% hydrogen peroxide and indicated amounts of concentrated sulfuric acid were mixed and reacted at 100° C. for 5 minutes with agitation. Results of these reactions are stated in Table III which follows:

*Table III*

| | Wt. Percent Acid | Equivalents H+ per Kg. | Conversion, Percent |
|---|---|---|---|
| (a) | 0 | 0 | 15 |
| (b) | 0.25 | 0.05 | 35 |
| (c) | 1.0 | 0.20 | 55 |
| (d) | 2.0 | 0.40 | 63 |
| (e) | 10.0 | 2.04 | 64 |

EXAMPLE 10

This example is included to show various acids useful in catalyzing the present reaction. In these reactions mixtures of 100 grams of potassium dipersulfate, 14.0 grams of 90% hydrogen peroxide, and the indicated amounts of acids were stirred together for 5 minutes at 100° C., cooled and analyzed. Results of these reactions are shown in Table IV which follows:

*Table IV*

| Acid | Wt. Percent Acid | Equivalent H+ per Kg. | Conversion, Percent |
|---|---|---|---|
| None | 0 | 0 | 14.5 |
| $KHSO_4$ | 2.5 | 0.18 | 28.0 |
| $H_3PO_4$ | 1.2 | 0.38 | 43.4 |
| $H_2SO_4$ | 1.5 | 0.32 | 64.1 |
| $HClO_4$ | 2.9 | 0.29 | 65 |

EXAMPLE 11

This example is included to illustrate the effect of temperature on the present reaction. In these reactions 100 grams of potassium dipersulfate, 14.0 grams of 90% hydrogen peroxide and 2 grams of concentrated sulfuric acid were reacted together for 5 minutes at the various temperatures. The reaction product mixtures were then cooled and analyzed. Results are stated in terms of molar conversion in Table V which follows:

*Table V*

| Temperature, ° C. | Conversion, percent |
|---|---|
| 25 | 2 |
| 40 | 20 |
| 50 | 30 |
| 60 | 40 |
| 70 | 50 |
| 80 | 56 |
| 90 | 63 |
| 100 | 68 |
| 110 | 72 |
| 120 | 76 |
| 130 | 79 |

It will be noted from the results in Table V that it is possible to conduct the reaction at temperatures above 120° C. However, it is not desirable to employ temperatures above this level for the reason that vapors of hydrogen peroxide at temperatures above about 120° C. often reach concentrations which are detonable. Accordingly, while for reasons of safety it is preferable not to operate above 120° C., excellent yields of monopersulfate can be obtained above this temperature, and it is not intended to exclude operation at temperatures above 120° C. from the present invention.

Pursuant to the requirement of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of producing a monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) a dipersulfate from the group consisting of ammonium dipersulfate, the alkali metal dipersulfates, and the alkaline earth metal dipersulfates, and (b) aqueous hydrogen peroxide having a concentration of at least about 50%.

2. Method of claim 1 wherein the temperature is about 80° to 100° C.

3. Method of producing potassium monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) potassium dipersulfate, and (b) aqueous hydrogen peroxide having a concentration of at least about 50%.

4. Method of producing ammonium monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) ammonium dipersulfate, and (b) aqueous hydrogen peroxide having a concentration of at least about 50%.

5. Method of producing sodium monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) sodium dipersulfate, and (b) aqueous hydrogen peroxide having a concentration of at least about 50%.

6. Method of producing magnesium monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) magnesium dipersulfate, and (b) aqueous hydrogen peroxide having a concentration of at least about 50%.

7. Method of producing calcium monopersulfate comprising reacting together, in the presence of an amount of a strong oxygenated inorganic acid which provides 0.05 to 2.2 equivalents of hydrogen ion per kilogram of reaction mixture and at a temperature of about 50° to 120° C., (a) calcium dipersulfate, and (b) aqueous hydrogen peroxide having a concentration of at least about 50%.

8. Method of producing a monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 120° C., (a) a dipersulfate from the group consisting of ammonium dipersulfate, the alkali metal dipersulfates, and the alkaline earth metal dipersulfates, and (b) aqueous hydrogen peroxide having a concentration of at least about 50%.

9. Method of claim 8 wherein the temperature is about 80° to 100° C.

10. Method of producing potassium monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 100° C., (a) potassium dipersulfate, and (b) aqueous hydrogen peroxide having a concentration of at least about 50%.

11. Method of producing ammonium monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 120° C., (a) ammonium dipersulfate, and (b) aqueous hydrogen peroxide having a concentration of at least about 50%.

12. Method of producing sodium monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 120° C., (a) sodium dipersulfate, and (b) aqueous hydrogen peroxide having a concentration of at least about 50%.

13. Method of producing magnesium monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 120° C., (a) magnesium dipersulfate, and (b) aqueous hydrogen peroxide having a concentration of at least about 50%.

14. Method of producing calcium monopersulfate comprising reacting together, in the presence of an amount of a strong oxygenated inorganic acid from the group consisting of sulfuric acid, phosphoric acid, perchloric acid, and potassium acid sulfate, which provides 0.05 to 2.2 equivalents of hydrogen ion per kilogram of reaction mixture and at a temperature of about 50° to 120° C., (a) calcium dipersulfate, and (b) aqueous hydrogen peroxide having a concentration of at least about 50%.

References Cited in the file of this patent

Mellor: "A Comprehensive Treatise on Inorganic and Theoretical Chemistry," vol. 10, Longmans, Green and Co., N.Y., 1930, pp. 463 and 464.